(12) United States Patent
Rodriguez

(10) Patent No.: US 7,233,863 B2
(45) Date of Patent: Jun. 19, 2007

(54) GPS LOCATION FINDING DEVICE

(76) Inventor: Albert Rodriguez, 3521 Christopher La., Corona, CA (US) 92881

( * ) Notice: Subject to any disclaimer, the term of this patent is extended or adjusted under 35 U.S.C. 154(b) by 274 days.

(21) Appl. No.: 10/799,862

(22) Filed: Mar. 12, 2004

(65) Prior Publication Data
US 2005/0200521 A1 Sep. 15, 2005

(51) Int. Cl.
*G01C 21/00* (2006.01)

(52) U.S. Cl. ............. 701/213; 701/200; 701/214; 342/357.06; 342/357.12

(58) Field of Classification Search ......... 701/200, 701/213, 214, 215, 220, 300; 342/357.01, 342/357.06, 357.12; 340/988, 989
See application file for complete search history.

(56) References Cited

U.S. PATENT DOCUMENTS

| | | | |
|---|---|---|---|
| 5,099,245 A | 3/1992 | Sagey | |
| 5,119,102 A | 6/1992 | Barnard | |
| 5,119,301 A | 6/1992 | Shimizu et al. | |
| 5,142,281 A | 8/1992 | Park | |
| 5,247,440 A | 9/1993 | Capurka et al. | |
| 5,283,575 A | 2/1994 | Kao et al. | |
| 5,311,197 A | 5/1994 | Sorden et al. | |
| 5,428,546 A | 6/1995 | Shah et al. | |
| 5,450,329 A | 9/1995 | Tanner | |
| 5,483,455 A | 1/1996 | Lay et al. | |
| 5,523,765 A | 6/1996 | Ichikawa | |
| 5,550,743 A | 8/1996 | Kyrtsos | |
| 5,594,650 A | 1/1997 | Shah et al. | |
| 5,598,167 A | 1/1997 | Zijderhand | |
| 5,608,635 A | 3/1997 | Tamai | |
| RE35,498 E | 4/1997 | Barnard | |
| 5,627,549 A | 5/1997 | Park | |
| 5,629,693 A | 5/1997 | Janky | |
| 5,636,122 A | 6/1997 | Shah et al. | |
| 5,673,305 A | 9/1997 | Ross | |
| 5,758,313 A | 5/1998 | Shah et al. | |
| 5,774,825 A | 6/1998 | Reynolds | |
| 5,777,580 A | 7/1998 | Janky et al. | |
| 5,794,174 A | 8/1998 | Janky et al. | |
| RE35,920 E | 10/1998 | Sorden et al. | |
| 5,832,406 A | 11/1998 | Iwami et al. | |
| 5,884,216 A | 3/1999 | Shah et al. | |
| 5,900,825 A | 5/1999 | Pressel et al. | |
| 5,906,654 A | 5/1999 | Sato | |
| 5,910,782 A | 6/1999 | Schmitt et al. | |
| 5,914,675 A * | 6/1999 | Tognazzini | ......... 340/989 |
| 5,929,752 A | 7/1999 | Janky et al. | |

(Continued)

OTHER PUBLICATIONS

Steven Mann, "Backcountry Gadgetry", Gadget Review—GearReview.com; http://www.gearreview.com/gadgets_01.asp.

*Primary Examiner*—Gertrude A. Jeanglaude
(74) *Attorney, Agent, or Firm*—MacPherson Kwok Chen & Heid LLP; Tom Chen

(57) ABSTRACT

A location finder device uses a GPS (Global Positioning System) to lock in location coordinates of a user site or a stationary car and then uses GPS and the last locked-in coordinates to direct the user back to the original location. The device may use special encrypted, firm-coded language to handle each function and operation, such as to calculate all locked in coordinates and to display the distance for the user to return to the last locked-in location.

23 Claims, 3 Drawing Sheets

U.S. PATENT DOCUMENTS

| | | |
|---|---|---|
| 5,983,156 A | 11/1999 | Andrews |
| 5,999,130 A | 12/1999 | Snow et al. |
| 6,011,461 A * | 1/2000 | Luper .................. 340/441 |
| 6,016,795 A | 1/2000 | Ohki |
| 6,026,345 A | 2/2000 | Shah et al. |
| 6,037,881 A | 3/2000 | Bornhauser et al. |
| 6,049,755 A | 4/2000 | Lou et al. |
| 6,067,007 A | 5/2000 | Gioia |
| 6,088,648 A | 7/2000 | Shah et al. |
| 6,127,924 A | 10/2000 | Hung |
| 6,151,549 A | 11/2000 | Andrews et al. |
| 6,166,626 A | 12/2000 | Janky et al. |
| 6,202,317 B1 | 3/2001 | Mueggenberg |
| 6,236,357 B1 | 5/2001 | Corwith |
| 6,266,617 B1 | 7/2001 | Evans |
| 6,298,306 B1 | 10/2001 | Suarez et al. |
| 6,317,720 B1 | 11/2001 | Murakami et al. |
| 6,360,167 B1 | 3/2002 | Millington et al. |
| 6,363,324 B1 | 3/2002 | Hildebrant |
| 6,392,592 B1 | 5/2002 | Johnson et al. |
| 6,393,360 B1 | 5/2002 | Ma |
| 6,405,125 B1 | 6/2002 | Ayed |
| 6,407,698 B1 | 6/2002 | Ayed |
| 6,438,382 B1 * | 8/2002 | Boesch et al. .......... 455/456.6 |
| 6,442,485 B2 | 8/2002 | Evans |
| 6,456,931 B1 | 9/2002 | Polidi et al. |
| 6,489,897 B2 | 12/2002 | Simon |
| 6,489,921 B1 | 12/2002 | Wilkinson |
| 6,498,969 B2 | 12/2002 | Alacoque et al. |
| 6,529,831 B1 | 3/2003 | Smith et al. |
| 6,590,534 B1 | 7/2003 | Kroll et al. |
| 6,611,742 B1 | 8/2003 | Sand et al. |
| 6,622,086 B2 | 9/2003 | Polidi |
| 6,633,811 B1 | 10/2003 | Aumayer |
| 6,650,999 B1 | 11/2003 | Brust et al. |
| 6,651,001 B2 | 11/2003 | Apsell |
| 6,819,256 B2 * | 11/2004 | Hampton ................. 340/691.6 |
| 2001/0019315 A1 | 9/2001 | Boulay et al. |
| 2001/0020204 A1 | 9/2001 | Runyon et al. |
| 2001/0051853 A1 | 12/2001 | Evans |
| 2002/0008660 A1 | 1/2002 | Johnson et al. |
| 2002/0039071 A1 | 4/2002 | Simon |
| 2002/0082025 A1 | 6/2002 | Baese et al. |
| 2002/0084893 A1 | 7/2002 | Eisenman |
| 2002/0101366 A1 | 8/2002 | Flick |
| 2002/0109049 A1 | 8/2002 | Alacoque et al. |
| 2002/0128772 A1 | 9/2002 | Polidi et al. |
| 2003/0030572 A1 | 2/2003 | Simon |
| 2003/0055560 A1 | 3/2003 | Phillips |
| 2003/0105583 A1 | 6/2003 | Aloi et al. |
| 2003/0114206 A1 * | 6/2003 | Timothy et al. ............ 455/575 |
| 2003/0154020 A1 | 8/2003 | Polidi |
| 2003/0171860 A1 | 9/2003 | Fan et al. |
| 2003/0176968 A1 | 9/2003 | Apsell |
| 2003/0182054 A1 | 9/2003 | Peterson et al. |
| 2003/0197640 A9 | 10/2003 | Johnson et al. |
| 2003/0212996 A1 | 11/2003 | Wolzien |
| 2004/0006426 A1 | 1/2004 | Armstrong et al. |

\* cited by examiner

GPS LOCATION FINDING DEVICE

BACKGROUND

Car owners often forget where they parked their cars, especially in large parking lots at malls, amusement parks and stadiums or in an area with limited visibility (e.g., a heavily wooded forest).

SUMMARY

A GPS (Global Positioning System) location finding device locks in location coordinates of a stationary car or person and then uses GPS signals and the last locked-in coordinates to direct the user back to the locked-in coordinates (e.g., car location, camp site, meeting site, etc.). The device may use special encrypted, firm-coded language to handle each function and operation, which may include mathematical functions. The device may also be used by children, hikers, joggers and campers who get lost. The device will point them in a direction back to a specific starting location, such as a campsite or car.

The device may provide a number of advantages. For example, the device may be small, compact, lightweight and adapted to fit on a keychain. The device may be relatively inexpensive to make and own. One configuration of the device does not require a user to purchase any other equipment. For example, one configuration of the device communicates with a GPS satellite and does need not to communicate with any component on the car or a like device. Thus, the device may be a stand-alone unit.

One general aspect relates to a portable device comprising a keypad, which is pressable by a user, a microcontroller coupled to the keypad, a Global Positioning System (GPS) sensor coupled to the microcontroller, and a display coupled to the microcontroller. The microcontroller is operable to direct the GPS sensor to request and receive first location coordinates of a first location of the user when the user presses the keypad. The microcontroller is operable to store the first location coordinates. The microcontroller is operable to direct the GPS sensor to request and receive second location coordinates at a second location (e.g., the user's present location) when the user presses the keypad. The microcontroller is operable to compare the first and second location coordinates and cause the display to indicate information directing the user from the second location to the first location.

Another general aspect relates to a method that includes receiving at a portable device a first input from a user; responsive to the first input, sending a signal to a Global Positioning System (GPS) to retrieve first location coordinates of the portable device from the GPS; storing the first location coordinates in the portable device; receiving at the portable device a second input from a user; responsive to the second input, sending a signal to the GPS to retrieve second location coordinates of the portable device from the GPS; comparing the second location coordinates to the first location coordinates; and displaying a direction arrow to indicate a direction from the second location coordinates to the first location coordinates.

The details of one or more aspects are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
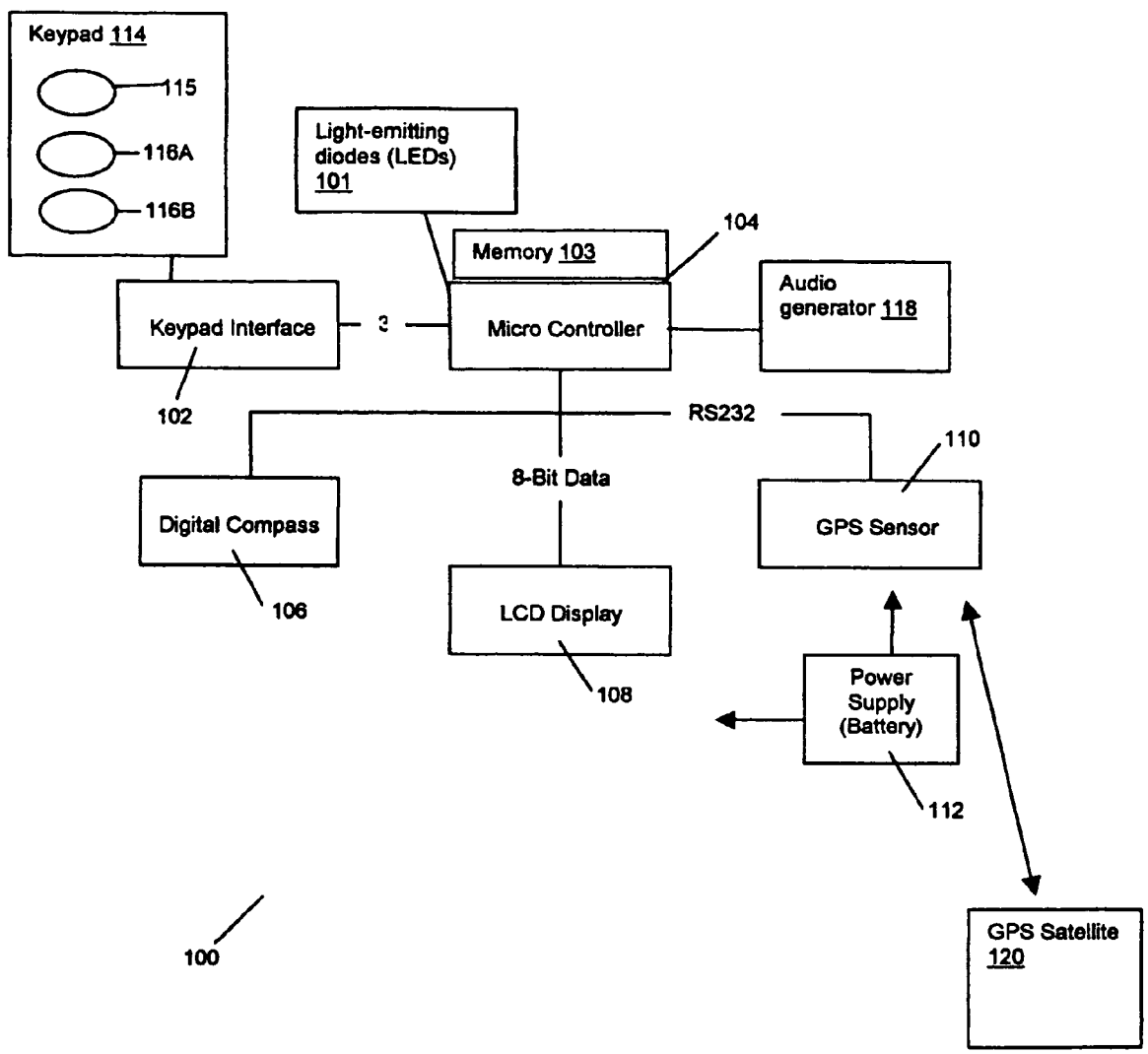
FIG. 1 illustrates components of a location finder device.

FIG. 1 illustrates components of a location finder device 100. The device 100 may have a key-ring handle to fasten to a standard key chain. The device 100 may be implemented in a small housing with dimensions such as 1½" width×2" length×½" height. Other configurations of the device 100 may have other dimensions. The device 100 may include light emitting diodes (LEDs) 101, a keypad 114, a keypad interface 102, a microcontroller 104, a memory 103, a digital compass 106, a liquid crystal display (LCD) 108, a Global Positioning System (GPS) sensor 110 and a power supply 112, such as a battery. The GPS sensor 110 may include a GPS microchip.

The keypad 114 may have one or more buttons, such as a power button 115 to control a switch to activate and de-activate the device 100, a first small button 116A to control a switch to lock in a first location, and a second small button 116B to control a switch to determine a second location or as a scroll, letting a user go into a menu or a second location finder.

The LCD display may receive 8-bit data from the microcontroller 104. The LCD display 108 may be 1"×1". A door compartment for the battery 112 may be 1½"×1".

A primary application for the location finder device 100 is to locate a stationary vehicle in parking lots, camp sites or other areas where there may be other vehicles parked in the same area or even no other vehicle in landscape having limited visibility (e.g., a heavily wooded forest). The term "car" or "vehicle" may refer to any type of vehicle that moves and then becomes stationary, including trucks, motorcycles, bicycles, scooters, water craft, etc.

Figure 2:
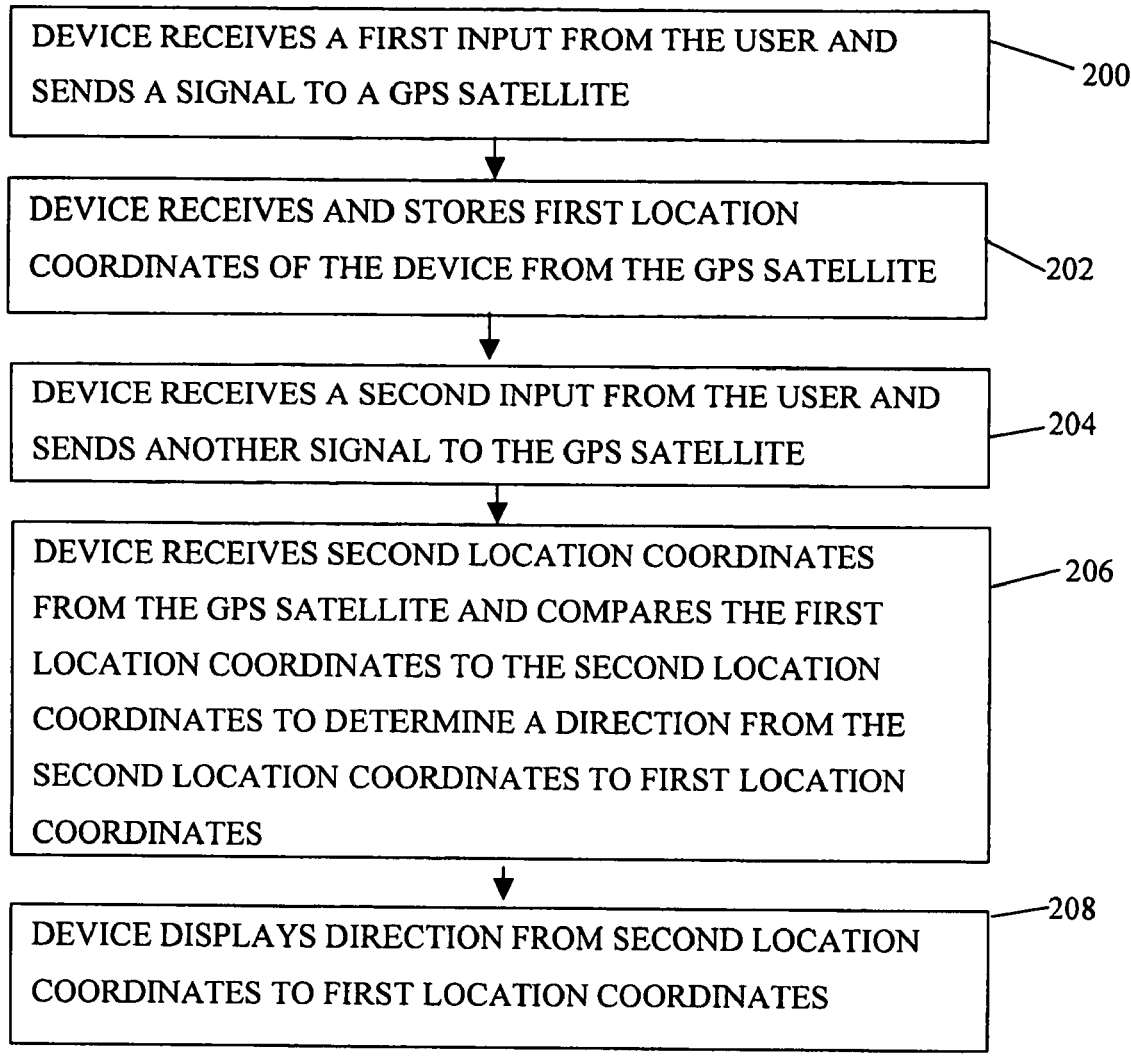
FIG. 2 illustrates a method of operating the location finder device of FIG. 1.

FIG. 2 illustrates a method of operating the device 100. When a user parks a vehicle and plans to leave the vehicle (or wishes to return to a location, such as a campsite), the user presses the power button 115 to activate the device 100 and presses the first small button 116A to lock-in a location of the device 100 in or near the vehicle (block 200). The device 100 sends a signal to a GPS satellite 120. The GPS satellite 120 sends a set of location coordinates to the device 100, which stores the location coordinates in the memory 103 in block 202. The user may then leave the vehicle and take the device 100 to a shopping area, a hiking trail, a stadium, etc.

When the user desires to return to the vehicle (or first location, e.g., campsite), the user presses the second button 116B on the device 100 in block 204. The device 100 requests location coordinates from the GPS satellite 120 and compares the present coordinates of the location of the user to the previously locked-in coordinates representing the location at which the vehicle was parked (block 206). In block 208, the LCD display 108 helps the user return to the last locked-in location by providing a visual display of the last locked-in coordinates (e.g., of the vehicle), a direction arrow to the locked-in coordinates of the vehicle and/or a distance to the last locked-in location. For example, the LCD 108 may display a distance that progressively decrements, e.g., 50 feet, 40 feet, 20 feet, as the user approaches the last locked-in location. The LCD 108 or the LED's 101 may indicate Location Found, Location Activated, and Low Battery.

In another embodiment, the user may press the same button to (a) lock-in coordinates of the vehicle and (b) requests location coordinates from the GPS satellite 120 and compares the present coordinates of the location of the user to the previously locked-in coordinates representing the location at which the vehicle was parked.

The device may too may include three switches activated by the keypad 114. The keypad 114 may be coupled to a first switch to activate the device 100 from a power OFF state or sleep state to an ON state. The button 116A may be coupled to a second switch to activate and lock in an initial location. The button 116B may be coupled to a third switch to lock in a second, or present, location or control a scroll button that allows the user to scroll into a menu for other possible options displayed on the LCD 108.

The microcontroller 104 may communicate with the other components via the RS232 standard or some other standard. The device 100 may use special encrypted, firm-coded language to handle each function and operation.

The digital compass 106 may have two functions. First, the digital compass 106 may lock the North Pole as a main reference point. Second, the digital compass 106 may use the North Pole as a main reference point to calculate different locations based on the main reference point and provide the exact distance and location of the last locked-in position. The digital compass 106 will also help the LCD 108 display the direction and distance of the last locked-in position of the vehicle or the last position locked-in.

The device 100 may include an audio generator 118 to generate an audio response, such as beeps or rings, which may change in tone or frequency to inform the user of the direction and/or distance to the locked-in coordinates, e.g., of the vehicle.

Figure 3:
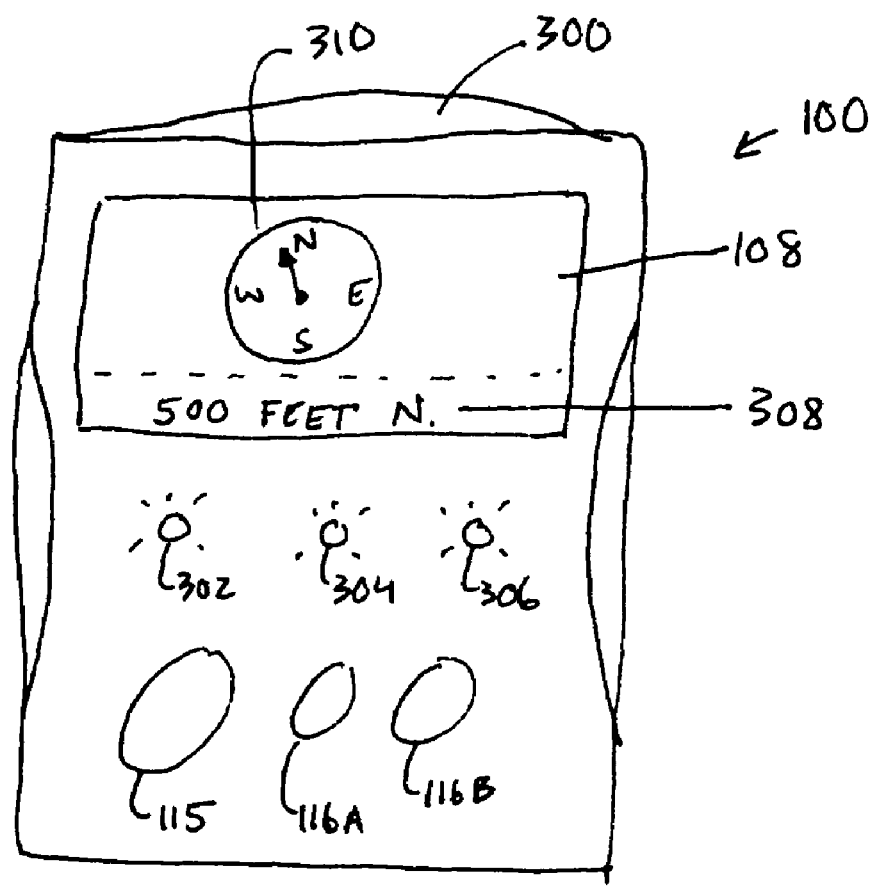
FIG. 3 illustrates an example of the location finder device of FIG. 1.

FIG. 3 illustrates an example of the location finder device 100 of FIG. 1 with a key chain holder 300. The LCD 108 may be a 1" blue glow LCD display showing North, East, South, West directions 308 and text 308 of a distance to the locked-in coordinates. There may be three LED indicators 302–306, such as an LED 302 to indicate System activated, an LED 304 (may blink) to indicate the device is within 3 to 7 feet of the last locked-in location, and an LED 306 to indicate a low battery status.

A number of aspects have been described. Nevertheless, it will be understood that various modifications may be made. For example, instead of cars, the device 100 may be used to track other stationary sites, such as a bicycle, a camp site, a meeting place, etc. As another example, the device 100 may be implemented in a mobile phone, a personal digital assistant (PDA), a laptop computer or some other type of portable device. The device may be implemented through any combination of software and hardware. Accordingly, other aspects are within the scope of the following claims.

What is claimed is:

1. A portable device comprising:
a keypad being pressable by a user;
a microcontroller coupled to the keypad;
a Global Positioning System (GPS) sensor coupled to the microcontroller; and
a display coupled to the microcontroller; wherein the microcontroller is operable to (a) direct the GPS sensor to request and receive first location coordinates of a first location of the user when the user presses the keypad, (b) store the first location coordinates, (c) direct the GPS sensor to request and receive second location coordinates at a second location when the user presses the keypad, (d) compare the first and second location coordinates and cause the display to indicate information directing the user from the second location to the first location.

2. The portable device of claim 1, wherein the first location is a location of a stationary vehicle.

3. The portable device of claim 1, wherein the keypad comprises first and second buttons, the first button causing the microcontroller to direct the GPS sensor to request and receive location coordinates of the stationary vehicle location and store the stationary vehicle location coordinates; the second button causing the microcontroller to direct the GPS sensor to request and receive second location coordinates at the second location and compare the stationary vehicle and second location coordinates and cause the display to indicate information directing the user from the second location to the stationary vehicle location.

4. The portable device of claim 1, wherein the device is implemented in a housing having a width of 1½", a length of 2", and a height of ½".

5. The portable device of claim 1, wherein the device is implemented as a key chain.

6. The portable device of claim 1, wherein the display comprises a liquid crystal display.

7. The portable device of claim 1, further comprising one or more light emitting diodes (LEDs) to indicate at least one of a power activated state, a location search activated state, a stationary vehicle location found state, and a low battery state.

8. The portable device of claim 1, further comprising a digital compass coupled to the microcontroller to lock in a direction reference point.

9. The portable device of claim 1, further comprising a digital compass coupled to the microcontroller to determine a direction of the stationary vehicle location coordinates relative to the second location.

10. The portable device of claim 1, further comprising a digital compass coupled to the microcontroller to determine a distance between the stationary vehicle location coordinates and the second location coordinates.

11. The portable device of claim 1, further comprising a power button to control an on/off state of the device.

12. The portable device of claim 11, wherein the microcontroller uses an encrypted, firm-coded language to perform each function.

13. The portable device of claim 1, wherein the display is operable to display a distance from the device to the stationary vehicle location.

14. The portable device of claim 1, further comprising an audio generator to emit sounds to the user indicating a distance to the stationary vehicle location.

15. A system comprising: a Global Positioning System (GPS); a
portable device comprising:
first and second buttons being pressable by a user; a microcontroller coupled to
the buttons;
a Global Positioning System (GPS) sensor coupled to the microcontroller, the GPS sensor being operable to transmit and receive signals with the Global Positioning System; and
a display coupled to the microcontroller; wherein the microcontroller is operable to (a) direct the GPS sensor to request and receive first location coordinates of a first location of a stationary vehicle when the user presses the first button, (b) store the first location coordinates, (c) direct the GPS sensor to request and receive second location coordinates at a second location when the user presses the second button, (d) compare the first and second location coordinates and direct the display to display a direction from the second location to the first location.

16. The system of claim 15, wherein the portable device is implemented in a key chain.

17. The system of claim 15, wherein the Global Positioning System comprises a satellite.

18. A method performed by a portable locator device, the method comprising:
receiving a first input from a user at the portable La cater device;
responsive to the first input, sending a signal to a Global Positioning System (GPS) to retrieve first location coordinates of the portable locater device from the GPS;
storing the first location coordinates in the portable locater device; receiving a second input from a user at the portable locater device;
responsive to the second input, sending a signal to the GPS to retrieve second location coordinates of the portable device from the GPS;
comparing the second location coordinates to the first location coordinates; and
displaying a direction arrow to indicate a direction from the second location coordinates to the first location coordinates.

19. The method of claim 18, further comprising displaying a distance from the second location coordinates to the first location coordinates.

20. The method of claim 18, further comprising providing a housing for the portable device, the housing having a width of 1½", a length of 2", and a height of ½".

21. The method of claim 18, further comprising indicating at least one of a power activated state, a location search activated state, a first location found state, and a low battery state of the device.

22. The method of claim 18, further comprising using an encrypted, firm-coded language to handle each function of the portable device.

23. The method of claim 18, further comprising emitting audio sounds to indicate a distance from the second location coordinates to the first location coordinates.

* * * * *